(12) United States Patent
Perge et al.

(10) Patent No.: US 11,715,130 B2
(45) Date of Patent: Aug. 1, 2023

(54) SYSTEMS AND METHODS FOR DESIGNING TARGETED MARKETING CAMPAIGNS

(71) Applicant: FMR LLC, Boston, MA (US)

(72) Inventors: Janos Perge, Boston, MA (US); Kishore Mosaliganti, Boston, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/549,218

(22) Filed: Dec. 13, 2021

(65) Prior Publication Data

US 2023/0186346 A1 Jun. 15, 2023

(51) Int. Cl.
*G06Q 30/02* (2023.01)
*G06Q 30/0251* (2023.01)
*G06N 20/00* (2019.01)

(52) U.S. Cl.
CPC ........ *G06Q 30/0251* (2013.01); *G06N 20/00* (2019.01)

(58) Field of Classification Search
CPC .......................... G06Q 30/0251; G06N 20/00
See application file for complete search history.

(56) References Cited

U.S. PATENT DOCUMENTS

| | | | | |
|---|---|---|---|---|
| 6,839,682 | B1 * | 1/2005 | Blume | G06Q 30/0255 705/26.1 |
| 7,725,300 | B2 | 5/2010 | Pinto et al. | |
| 10,592,917 | B2 | 3/2020 | Kim et al. | |
| 10,867,267 | B1 * | 12/2020 | Navaratna | G06F 16/951 |
| 2008/0208788 | A1 | 8/2008 | Merugu et al. | |
| 2011/0251877 | A1 | 10/2011 | Lawrence et al. | |
| 2014/0279074 | A1 | 9/2014 | Chen et al. | |
| 2017/0262759 | A1 | 9/2017 | Lawrence et al. | |
| 2018/0108049 | A1 * | 4/2018 | Kitts | G06Q 30/0272 |

(Continued)

FOREIGN PATENT DOCUMENTS

WO WO-2019144019 A1 * 7/2019 ............. A61B 3/113

OTHER PUBLICATIONS

Han, Data Mining: Concepts and Techniques, Elsevier, 2011; pages provided relevant to cosine similarity (Year: 2011).*

(Continued)

*Primary Examiner* — Scott C Anderson
(74) *Attorney, Agent, or Firm* — Cesari and McKenna, LLP

(57) ABSTRACT

A computer-implemented method is provided for identifying potential individuals to contact in a campaign of interest. The method includes receiving campaign data including description about the campaign of interest and information about the potential individuals to contact for the campaign of interest and selecting a plurality of trained machine learning models from a library of trained machine learning models based on the campaign data. The library of trained machine learning models is created from data of historical campaigns administered, and each of the selected plurality of trained models corresponds to a historical campaign that is within a similarity threshold from the campaign of interest. The method also includes scoring a pool of existing customers using the select plurality of trained machine learning models and identifying the potential individuals to contact in the campaign of interest by ranking the existing customers by their corresponding propensity scores.

17 Claims, 4 Drawing Sheets

(56) References Cited

U.S. PATENT DOCUMENTS

| | | | |
|---|---|---|---|
| 2021/0182912 A1* | 6/2021 | Misra | G06F 40/295 |
| 2021/0286945 A1* | 9/2021 | Nagar | G06F 40/166 |
| 2021/0357966 A1* | 11/2021 | Michel | G06Q 20/36 |

OTHER PUBLICATIONS

Brownlow et al., "A Multiple Source based Transfer Learning Framework for Marketing Campaigns," https://opus.lib.uts.edu.au/bitstream/10453/126032/1/IJCNN2018%20-JB.pdf, 8 pgs, 2018.

Dalessandro et al., "Scalable Hands-Free Transfer Learning for Online Advertising," https://www8.gsb.columbia.edu/cbs-directory/sites/cbs-directory/files/publications/indg0711-dalessandro.pdf), 10 pgs, 2014.

Perlich, "Machine Learning for Targeted Display Advertising: Transfer Learning in Action," https://www.researchgate.net/publication/256048420,23 pgs, 2014.

Deb et al., "Under the Hood of Uber's Experimentation Platform," https://eng.uber.com/xp/, 14 pgs, Aug. 28, 2018.

Yao, "5 Ways to Leverage AI Research in Marketing & Advertising," https://www.topbots.com/ai-research-marketing-advertising-applications/, 12 pgs, Apr. 23, 2020.

"The better way to work with marketing data, Collect, prepare and analyze all your marketing data with ease," https://funnel.io/, available prior to Dec. 13, 2021.

* cited by examiner

SYSTEMS AND METHODS FOR DESIGNING TARGETED MARKETING CAMPAIGNS

TECHNICAL FIELD

This application relates generally to systems, methods and apparatuses, including computer program products, for identifying potential individuals to contact in a marketing campaign of interest.

BACKGROUND

Goals of marketing campaigns for many organizations include improving brand awareness, launching new products, improving sales, and growing market share. Competitive markets and tight budgets require organizations to be accurate in choosing their target audience (the "Who"), use the right communication channel (the "How"), and selecting the appropriate messaging content (the "What") for a directed marketing campaign. Typically, marketing campaigns are launched at scale using a phased approach with test and control groups. Marketing teams identify a responsive cohort by observing outcomes in different segments to fine-tune their campaign content. Several challenges exist, including the need to test multiple messages, small treatment effects, limited sample size of customer base, and often prohibitive amount of preparation time and cost for designing and launching a new experiment. Other shortcomings include lack of standardization for marketing campaigns without being able to learn from past campaigns and uncertainty regarding the effective of campaigns.

SUMMARY

Systems and methods of the present invention generally improve outcomes of a marketing campaign based on data-driven insights. In some embodiments, these systems and methods are configured to organize past marketing campaign information in an easily retrievable format, manage a library of pre-trained campaign models, and distill/combine models based on the needs of a new campaign to estimate customer responses to the new campaign. By being able to estimate customer responses to a campaign before it starts, systems and methods of the present invention can lower any uncertainty associated with preparation of the new marketing campaign, streamline and customize campaign creation, reduce cost, time and resources, and improve productivity. In some embodiments, a user-friendly web-based user interface is provided that intuitively captures workflows of a user (e.g., a marketing leader or a product-manager) as the user designs a new campaign. More specifically, to help plan a new campaign, the web interface can automatically learn from client profiles and responses observed in prior marketing campaigns, help the user to prioritize the potential target customers, and fine-tune content. A user can intervene and augment the design process as needed. In general, systems and methods of the present invention can improve campaign outcomes in a variety of consumer settings, such as predicting customer appointments with a wealth advisor, forecasting if a customer is likely to open a managed account, managing customer churn, and predicting client channel preferences.

In one aspect, a computer-implemented method is provided for identifying potential individuals to contact in a campaign of interest. The computer-implemented method comprises receiving, by a computing device, campaign data including description about the campaign of interest and information about the potential individuals to contact for the campaign of interest. The method also includes selecting, by the computing device, a plurality of trained machine learning models from a library of trained machine learning models based on the campaign data. The library of trained machine learning models is created from data of historical campaigns administered. Each of the selected plurality of trained models corresponds to a historical campaign that is within a similarity threshold from the campaign of interest. The method further includes scoring, by the computing device, a pool of existing customers using the select plurality of trained machine learning models. Scoring the pool of existing customers includes scoring each existing customer by the plurality of selected trained machine learning models to generate a plurality of model scores and averaging the plurality of model scores to generate a propensity score for the corresponding existing customer. The method additionally includes identifying the potential individuals to contact in the campaign of interest by ranking the existing customers by their corresponding propensity scores.

In another aspect, a computer-implemented system is provided for identifying potential individuals to contact in a campaign of interest. The computer-implemented system comprises a user interface module configured to receive campaign data including description about the campaign of interest and information about the potential individuals to contact for the campaign of interest and a model library module configured to store trained machine learning models created from data associated with historical campaigns administered. The system also includes an inference module configured to select, from the model library module, a plurality of trained machine learning models based on the campaign data. Each of the selected plurality of trained models corresponds to a historical campaign that is within a similarity threshold from the campaign of interest. The inference module is also configured to score a pool of existing customers using the select plurality of trained machine learning models by (1) scoring each existing customer by the plurality of selected trained machine learning models to generate a plurality of model scores, and (2) averaging the plurality of model scores to generate a propensity score for the corresponding existing customer. The user interface module is further configured to identify the potential individuals to contact in the campaign of interest by ranking the existing customers by their corresponding propensity scores.

Any of the above aspects can include one or more of the following features. In some embodiments, the campaign data includes one or more of financial information of the potential individuals to contact, their financial habits, demographical information of the potential individuals to contact, and description of the campaign of interest. In some embodiments, the plurality of model scores are averaged.

In some embodiments, the campaign description for the campaign of interest is numerically vectorized using natural language processing. In some embodiments, selecting the plurality of trained machine learning models includes determining one or more relevant historical campaigns by (i) comparing vectorized campaign description of the historical campaigns with the vectorized campaign description of the campaign of interest and (ii) selecting the relevant historical campaigns using cosine similarity to the campaign of interest and the similarity threshold. Selecting the plurality of trained machine learning models further includes selecting the corresponding trained machine learning models from the library of trained machine learning models generated for the relevant historical campaigns. In some embodiments, the potential individuals to contact for the campaign of interest are identified using the trained machine learning models corresponding to the relevant historical campaigns without training a new machine learning model.

In some embodiments, after completion of the campaign of interest, a trained model from the campaign of interest is generated using machine learning and appended to the library. In some embodiments, the machine learning model for the completed campaign of interest is trained using the campaign data about the campaign of interest, data about customers targeted and reached by the campaign of interest, and customer responses following an outreach of the campaign of interest. The resulting trained machine learning model is configured to predict at least one campaign key performance indicator (KPI). An exemplary KPI includes a customer opening a promotional email or clicks on a URL link within a promotional message. In some embodiments, the trained model generates a model score predicts a likelihood that a customer with a given characteristic would perform an action toward the at least one KPI following the outreach of the campaign of interest.

In some embodiments, the potential individuals are selected based on (i) their corresponding propensity scores exceeding a threshold propensity score, or (ii) their corresponding propensity scores being largest within a predetermined population size.

In some embodiments, insights about the campaign of interest are generated including at least one of a predicted response rate from the potential individuals identified or a recommendation of campaign message content for the campaign of interest.

In some embodiments, one or more campaign outcomes across one or more campaign metrics for one or more of the historical campaigns are displayed.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
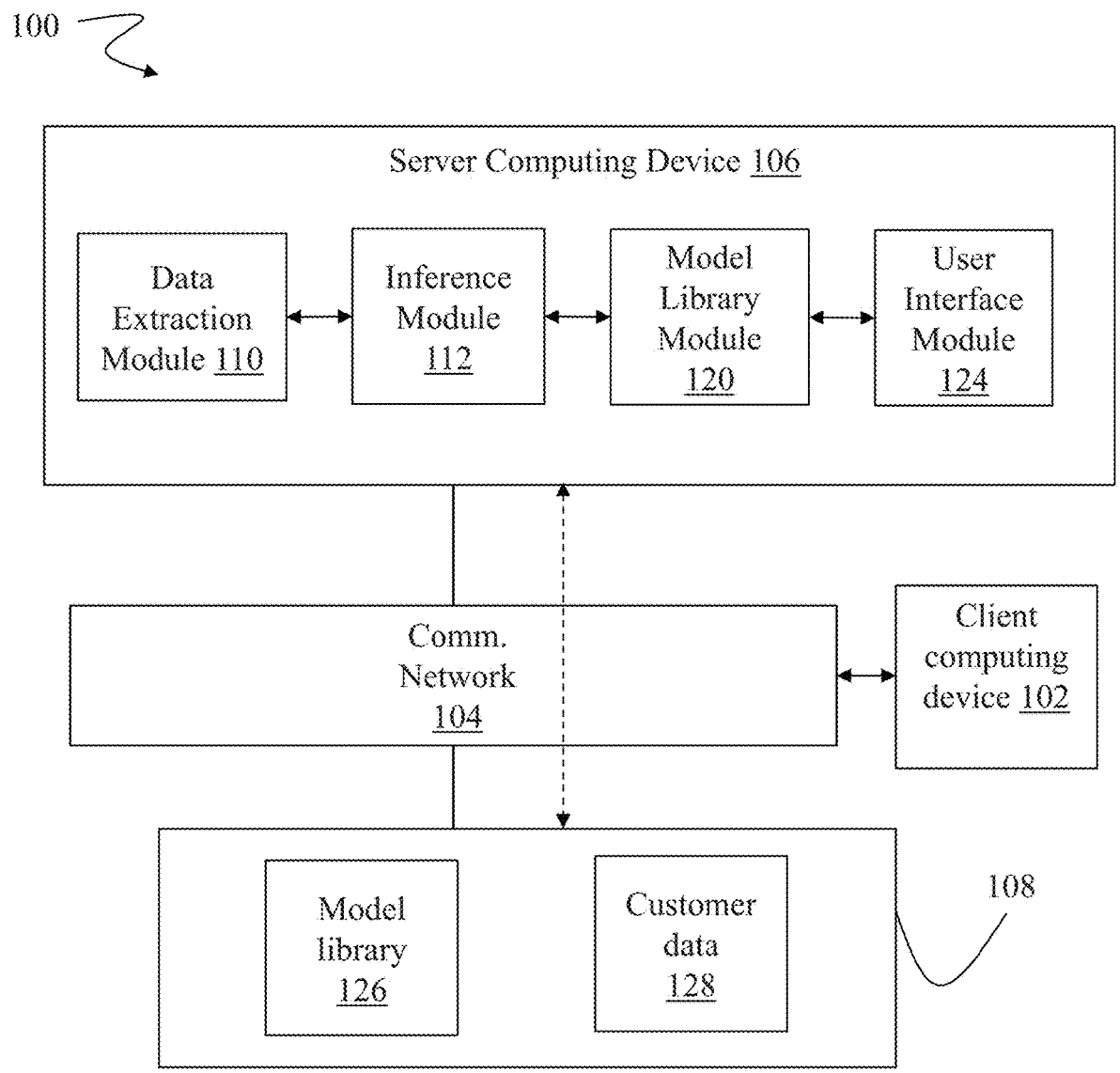
FIG. 1 shows an exemplary diagram of a system used in a computing environment to identify potential individuals for a campaign of interest, according to some embodiments of the present invention.

FIG. 1 shows an exemplary diagram of a system 100 used in a computing environment to identify potential individuals for a campaign of interest, according to some embodiments of the present invention. As shown, the system 100 generally includes a client computing device 102, a communications network 104, a data store 108, and a server computing device 106.

The client computing device 102 connects to the communications network 104 to communicate with the server computing device 106 and/or the data store 108 to provide input and receive output relating to the process of target customer identification. For example, the client computing device 102 can communicate with a user interface module 124 of the server computing device 106 to view a detailed graphical user interface (GUI) that allows the user to (i) enter specific information of a campaign of interest, (ii) review outputs resulting from the analysis methods and systems described herein, and/or (iii) modify inputs and/or outputs generated by the system 100. An exemplary user of the system 100 can be a market leader or a product-manager who is interested in designing a new marketing campaign. Exemplary client computing devices 102 include, but are not limited to, desktop computers, laptop computers, tablets, mobile devices, smartphones, and Internet appliances. In some embodiments, a user accesses the server computing device 106 via an Application Programming Interface (API) connected to the client computing device 102. It should be appreciated that other types of computing devices that are capable of connecting to the components of the system 100 can be used without departing from the scope of invention. Although FIG. 1 depicts a single client device 102, it should be appreciated that the system 100 can include any number of client devices.

The communication network 104 enables components of the system 100 to communicate with each other to perform the process of target customer identification as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a combination of hardware, including one or more processors and one or more physical memory modules and specialized software engines that execute on the processor of the server computing device 106, to receive data from other components of the system 100, transmit data to other components of the system 100, and perform functions as described herein. As shown, the processor of the server computing device 106 executes at least a data extraction module 110, an inference module 112, a model library module 120 and a user interface module 124, where the sub-components and functionalities of these components are described below in detail. In some embodiments, the components 110, 112, 120 and 124 are specialized sets of computer software instructions programmed onto a dedicated processor in the server computing device 106 and can include specifically designated memory locations and/or registers for executing the specialized computer software instructions.

The data store 108 is a computing device (or in some embodiments, a set of computing devices) that is coupled to and in data communication with the server computing device 106 and is configured to provide, receive and store data relevant to target customer identification. In some embodiments, all or a portion of the data store 108 is integrated with the server computing device 106 or located on a separate computing device or devices. For example, the data store 108 can comprise one or more databases, such as MySQL™ available from Oracle Corp. of Redwood City, Calif.

Figure 2:
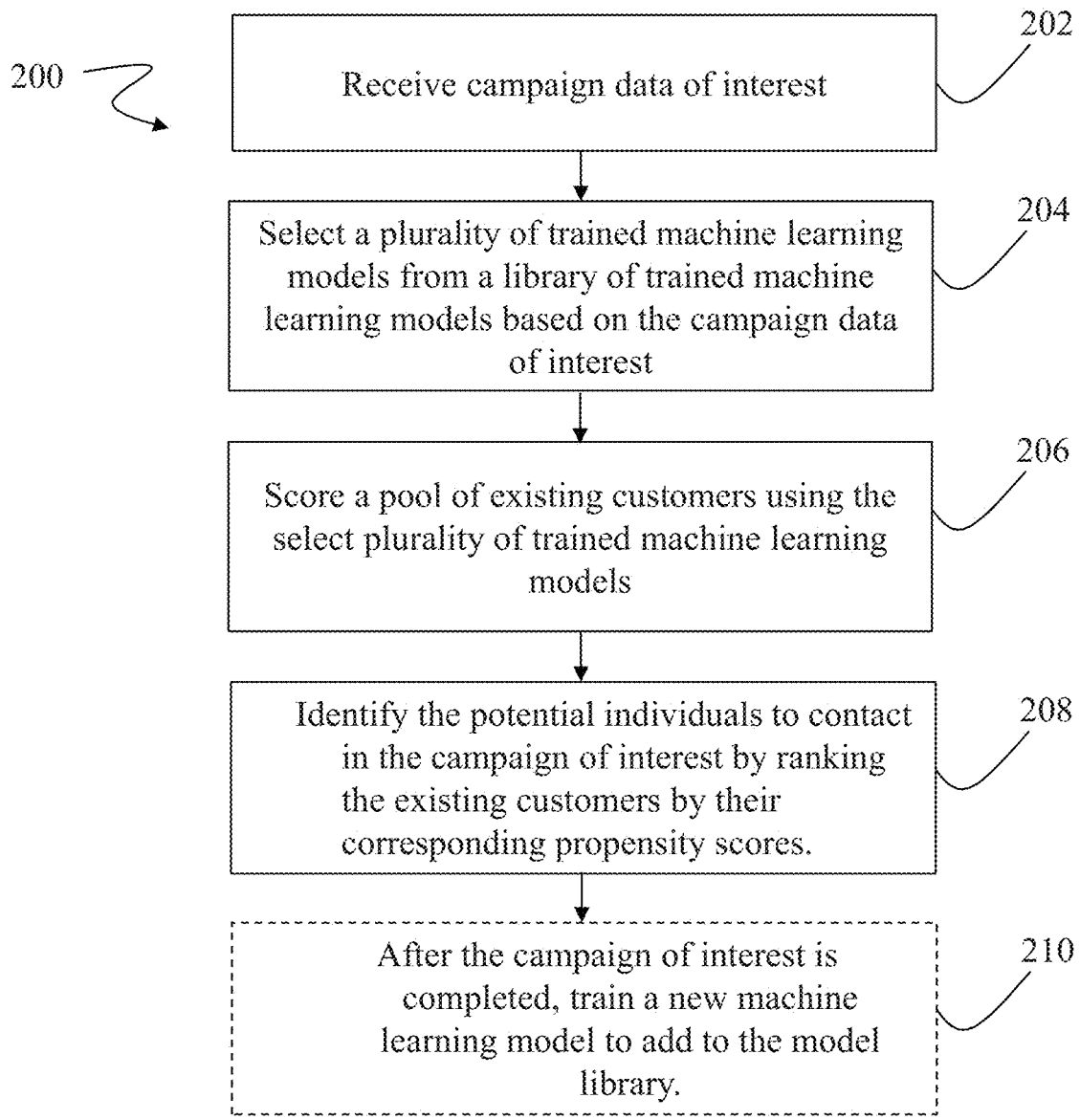
FIG. 2 shows an exemplary process implemented by the system of FIG. 1 to identify target individuals for a campaign of interest, according to some embodiments of the present invention.

In general, the system 100 of FIG. 1, in conjunction with the process described below with reference to FIG. 2, represents a data and modeling infrastructure to reuse information from historical/past marketing campaigns with the goal of improving new marketing experience. In some embodiments, historical marketing campaigns are mathematically formalized by the model library module 120 into trained machine learning models that can predict a range of customer responses. In some embodiments, these trained machine learning models are stored as a model library 136 in the data store 108 for future reference and usage. For a new campaign that is yet to commence (hereinafter referred to a "campaign of interest"), the system 100 is configured to select a relevant subset of the models from the library 126 of trained machine learning models to predict which individuals are likely to have a favorable response to the campaign of interest. These potential individuals can be identified from a pool of existing customers whose information are stored as customer data 128 in the data store 108. Alternatively, the potential individuals can be identified from a list of individuals supplied by the user via the user interface module 124.

FIG. 2 shows an exemplary process 200 implemented by the system 100 of FIG. 1 to identify target individuals for a campaign of interest, according to some embodiments of the present invention. The process 200 starts (at step 202) by receiving from a user, via the user interface module 124 of the system 100, campaign data related to the campaign of interest. The campaign data can comprise description about the campaign of interest, description of the potential individuals to contact for the campaign of interest, and other business criteria. Exemplary description of the campaign of interest includes targeted business lines, information regarding one or more products being marketed and/or at least one advertisement message to be sent to customers. In some embodiments, the description of the campaign of interest is captured and stored by the system 100 as a text string/message. Description of the potential individuals to contact for the campaign of interest can include financial information and demographical profile of these potential individuals. In some embodiments, the campaign data specifies at least one business relevant key performance indicator (KPI) for the campaign of interest. A KPI specifies a desired action in response to a marketing campaign, such as the customer will open a managed account within three months following a marketing campaign. In some embodiments, the collected campaign data is stored in the data store 108 of the system 100.

After receiving the campaign data for the campaign of interest, the inference module 112 of the system 100 is configured to select multiple trained machine learning models from the library 126 of trained machine learning models based on the campaign data (step 204). More specifically, the inference module 112 selects a trained model for the campaign of interest if the historical campaign corresponding to the trained model is within a similarity threshold from the campaign of interest. Details regarding training a machine learning model from data of historical marketing campaign by the model library module 120 is provided below with reference to FIG. 4. In some embodiments, the model library 126 stores each trained model along with a description of the historical campaign based on which the trained model is generated. The description of the historical campaign can be substantially similar to the campaign data received for the campaign of interest at step 202.

Figure 3:
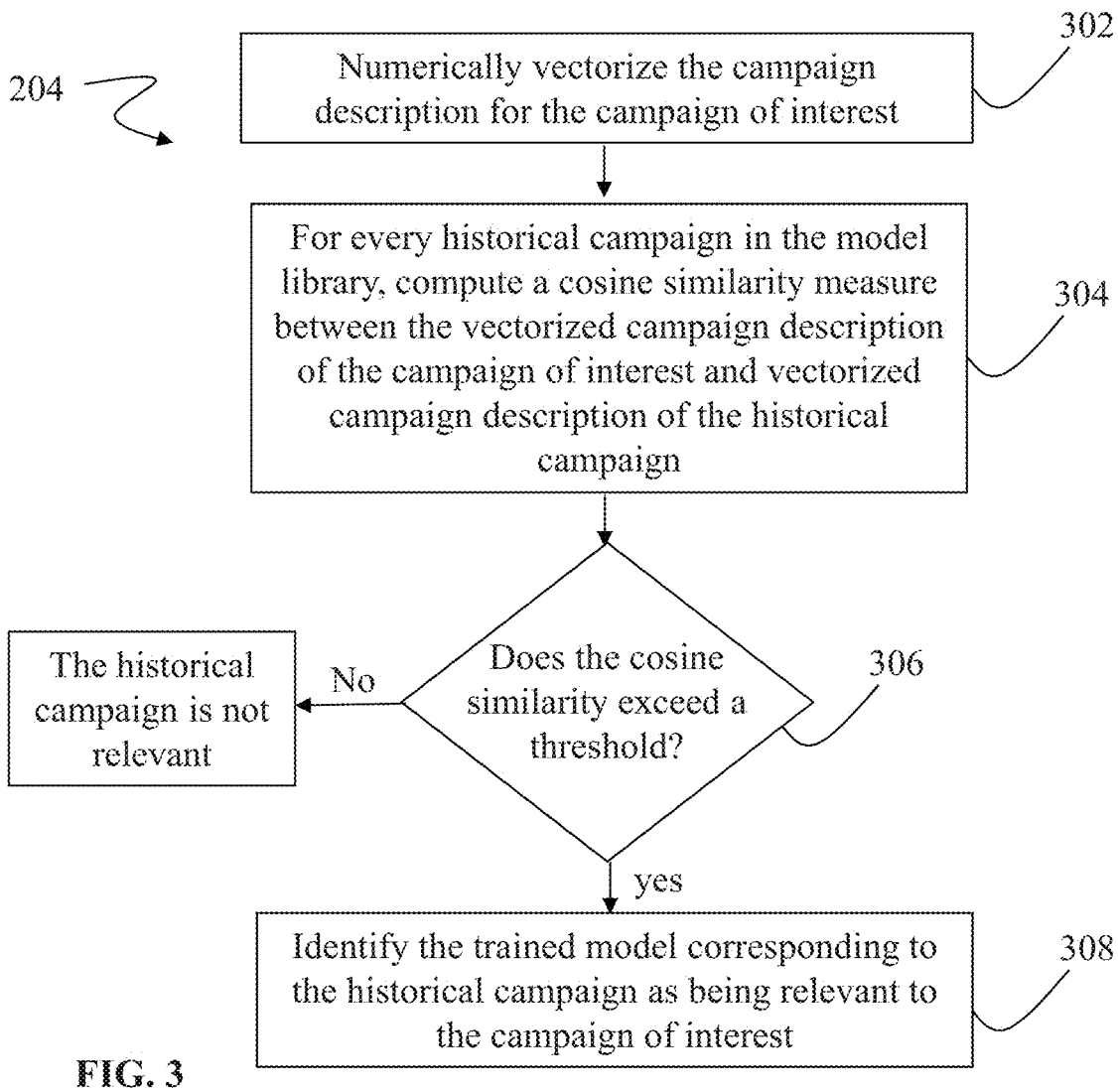
FIG. 3 shows an exemplary implementation of the selection step of the process of FIG. 2 for selecting the relevant trained machine learning models for a campaign of interest, according to some embodiments of the present invention.

FIG. 3 shows an exemplary implementation of the selection step 204 of the process 200 of FIG. 2 for selecting the relevant trained machine learning models for a campaign of interest, according to some embodiments of the present invention. The selection step 204 starts with the data extract module 110 of the system 100 numerically vectorizing at least a portion of the campaign data for the campaign of interest, such as the description of the campaign of interest, by applying a natural language processing algorithm or an elastic search algorithm (step 302). The inference module 112 then uses the vectorized campaign data to identify similar historical campaigns from the model library 126. More specifically, the inference module 112 can compute a cosine similarity measure between the vectorized campaign description of the campaign of interest (from step 302) and each vectorized campaign description of the historical campaigns stored in the model library 126 (step 304). The cosine similarity measure thus reflects a degree of semantic similarity in campaign descriptions (e.g., campaign messages) between the campaign of interest and a historical campaign. The inference module 112 is configured to identify a historical campaign as being relevant if the corresponding cosine similarity measure exceeds a predetermined similarity threshold (step 306). The inference module 112 then selects the trained machine learning model corresponding to each relevant historical campaign (from step 306) to form an ensemble of models relevant to the campaign of interest (step 308).

Referring back to FIG. 2, once a set of relevant trained machine learning models is determined, the inference module 112 proceeds to score the pool of existing customers 128 using the selected set of trained models (step 206). In some embodiments, the pool of existing customers 128 for the campaign of interest may include people who have been contacted by historical marketing campaigns. Scoring the pool of existing customers 128 can comprise, for each existing customer, (i) scoring that customer by each of the selected relevant machine learning models for a given KPI (see step 204 on model ensemble) to generate a set of model scores and (ii) averaging the set of model scores for that customer to generate a single propensity score. In some embodiments, aggregating the set of model scores comprises generating an average (or weighted average) of the scores. As described above, each trained machine learning model in the model library 126 is configured to predict a business relevant KPI, where the model prediction is defined as the likelihood that a customer with one or more given characteristics would perform a desired action as a result of the campaign outreach. Scoring a customer with a trained machine learning model involves providing certain characteristics of the customer (e.g., demographical and/or financial information about the customer) to the trained model to generate a score that predicts the choice of the customer regarding the KPI. In some embodiments, the model scores and the propensity score for each customer are calculated near real time. In alternative embodiments, the model scores and the model score averages for each customer are calculated in advance and stored in the data store 108 of the system 100 for fast retrieval.

Once the propensity scores for the existing customers are generated, the inference module 112 is configured to identify one or more potential individuals to contact for the campaign of interest by ranking the existing customers by their corresponding aggregate propensity scores (step 208). In some embodiments, the potential individuals to target for the campaign of interest are selected as those existing customers whose corresponding propensity scores exceed a predefined propensity score threshold. Alternatively, the potential individuals are selected based on their corresponding propensity scores being largest within a predetermined population size. Thus, individuals for a campaign of interest can be identified without training a new machine learning model, which can be time consuming and resource intensive. Instead, previously trained machine learning models from historical campaigns are reused based on their relevance (i.e., similarity in campaign descriptions) to identify these targeted individuals. Therefore, the process 200 leverages relevant existing machine learning models (which provide insights and informative features about marketing campaigns) to segment customers for new campaigns.

Figure 4:
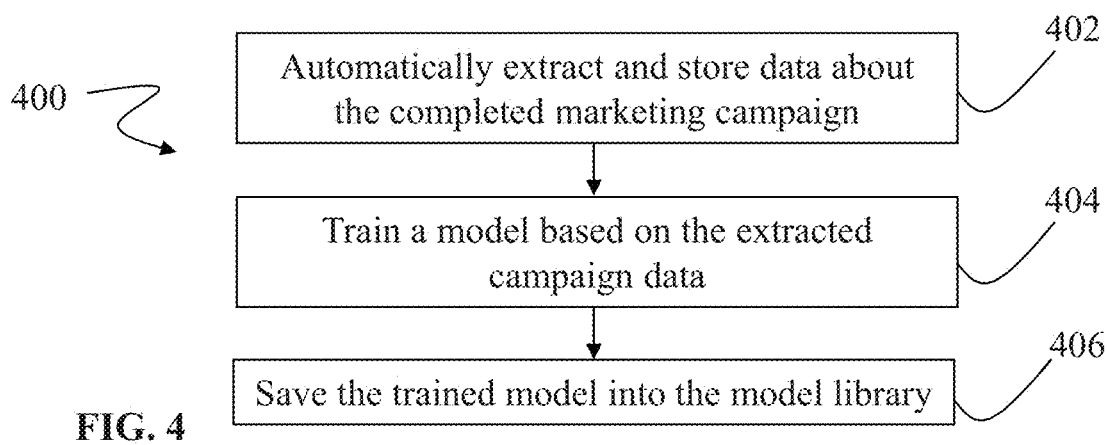
FIG. 4 shows an exemplary process employed by the system of FIG. 1 to generate a trained machine learning model to augment the model library, according to some embodiments of the present invention.

In some embodiments, data related to a new pool of customers and their responses following a campaign outreach is received, for instance as a small pilot campaign. Such pilot data might then be leveraged to select a model ensemble iteratively to maximize prediction performance on the pilot data, as opposed to selecting models into the ensemble based on their similarity of campaign descriptions. Potential individuals to contact in the campaign of interest can then be identified by scoring new customers using this customized model ensemble. Optionally, after the completion of the campaign of interest, the system 100 can capture customer responses for the campaign with respect to one or more KPI's (step 210) and use these responses (and other customer characteristics) to train a new machine learning model for that campaign. The trained model can then be appended to the model library 126 to augment the existing collection of trained machine learning models for the purpose of future customer selection for new campaigns. FIG. 4 shows an exemplary process 400 employed by the system 100 of FIG. 1 to generate a trained machine learning model to augment the model library 120, according to some embodiments of the present invention.

As shown in FIG. 4, the process 400 of appending the campaign of interest to the library of historical data sets and historical model library starts with the data extraction module 110 of the system 100 automatically extracting and storing data about the completed marketing campaign as well as about the customers targeted by the campaign (step 402). Such campaign data can be similar to the campaign data described above with respect to step 202 of process 200. For example, the extracted campaign data can include financial and demographical data associated with the customers contacted, business relevant KPIs for each campaign, the response of each customer, and information about the campaign (e.g. messages sent to the customers, targeted business lines, etc.).

Next, the model library module 120 retrieves data about the completed campaign created by the data extract module 110 from the customer database 128 of the data store 108 and trains at least one model (step 404) to predict at least one campaign KPI. For example, the trained model can predict the likelihood that a customer with a given characteristic would perform a desired action following the outreach (e.g., email) of a marketing campaign. Exemplary algorithms used to training a machine learning model can include, but not limited to, logistic regression, random forest, xgboost classifier, multilayer perceptron or deep learning models. In some embodiment, a training process employed by the model library module 120 comprises a model training and a validation step. The training step involves incrementally and iteratively adjusting parameters of the model to predict the desired KPI based on extracted campaign data until the prediction is a good match to the actual KPI realized from the campaign. The validation step involves testing the trained model on extracted data not used in the training step to ensure that the prediction made by the trained model generalizes to data unseen by the model. Once a trained model is created, the model library module 120 is configured to save the trained model into the model library 126 of the data store 108 (step 406).

In another aspect, a user of the system 100 of FIG. 1 can interact with the system 100 via a graphical user interface (GUI) generated by the user interface module 100 of the system 100 to retrieve desired campaign insights. For example, a user can input relevant data about a desired campaign via the GUI and, in response the user interface module 100 can trigger the inference module 112 to generate a list of recommended individuals for targeting by the campaign along with their corresponding propensity scores that predict the KPI for these individuals. In addition to recommending which customers to contact for the campaign of interest, the GUI can generate other insights and recommendations to the user, such as estimated response rate from the potential individuals identified, response rates within customer sub-segments, lower bound for campaign cohort size, recommend improvements for the campaign message, select an optimal campaign message from a multitude of campaign messages based on estimated customer responses and overall campaign outcomes, etc.

Figure 5:
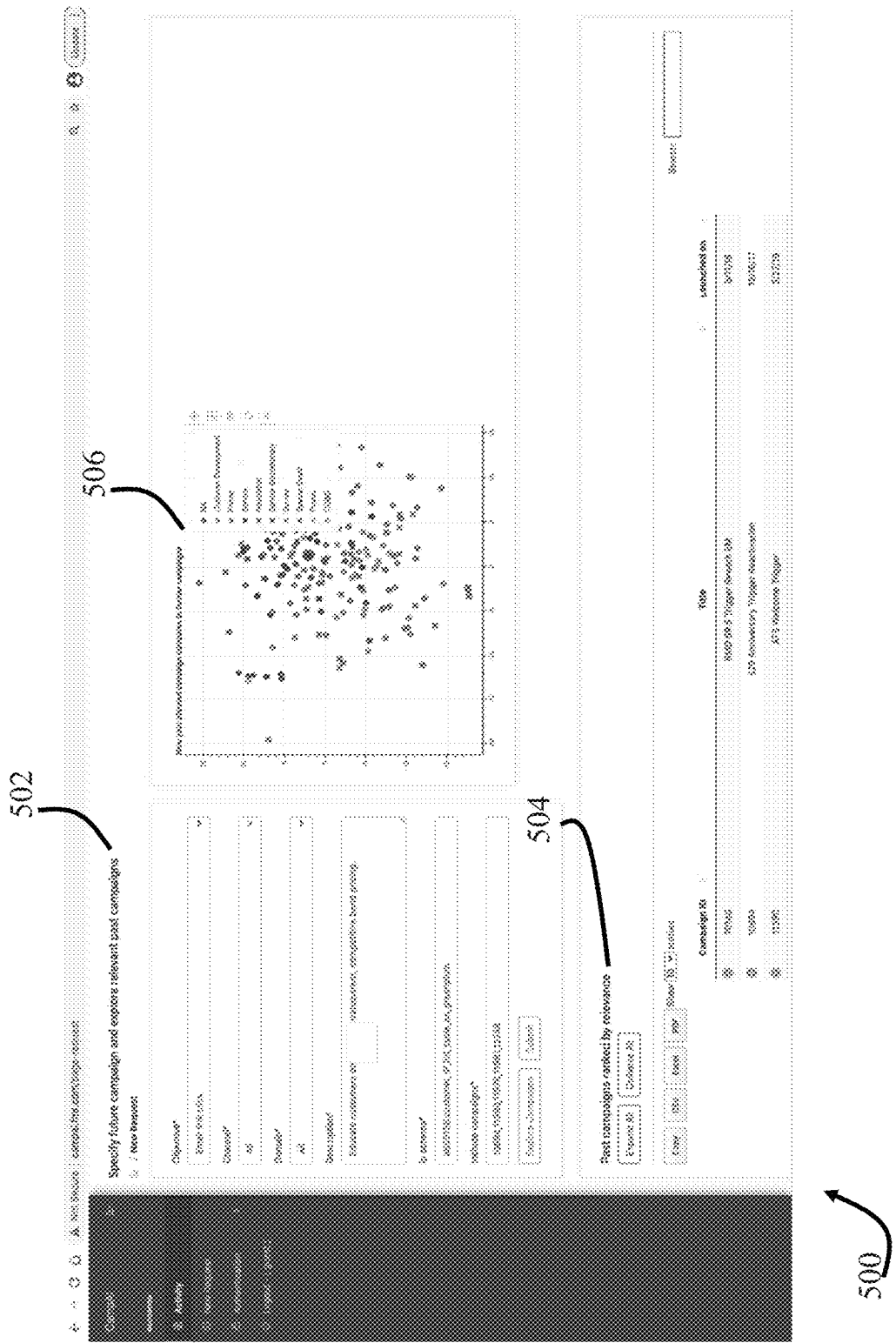
FIG. 5 shows an exemplary graphical user interface (GUI) displayed by the user interface module of the system of FIG. 1 to provide a list of historical campaigns related to a new campaign of interest, according to some embodiments of the present invention.

In some embodiments, the GUI is configured to display data about one or more historical campaigns related to the campaign of interest. FIG. 5 shows an exemplary graphical user interface (GUI) displayed by the user interface module 124 of the system 100 of FIG. 1 to provide a list of historical campaigns related to a new campaign of interest, according to some embodiments of the present invention. As shown, the GUI 500 includes a section 502 that allows a user to input features about the new campaign. In response, section 504 of the GUI 500 outputs a list 504 of related historical campaigns ranked by relevance to the new campaign. In some embodiments, the list of related historical campaigns is determined by the inference module 112 by executing step 204 of the process 200 of FIG. 2. More specifically, the list of related historical campaigns can correspond to the selected machine learning models that are similar to the campaign of interest in terms of campaign messages. Further, the GUI 500 can graphically illustrate how the new campaign compares to the historical campaigns in a chart section 506.

As described above, the present invention provides an automated scoring service to optimize the planning and execution of new marketing campaigns by leveraging data from historical campaigns using machine learning and reusing trained models (transfer learning). The automated scoring service can automatically train, store and reuse a vast number of models for targeted marketing campaigns and permit quick iterations of cohort generation to find more optimal campaign configurations while reducing uncertainty. Thus, the automatic scoring service of the present invention improves targeting and campaign outcomes, including in situations when response data on target customers is limited or missing. In addition, the automatic scoring service of the present invention can facilitate the identification of an effective/preferred messaging channel (e.g., email, online, or call) to be used to target a potential customer and optimize the selection/development of a campaign message with favorable estimated response rate. Further, the automatic scoring service makes it feasible for a user to identify customer sub-segments with favorable response and/or drill-down into details of relevant past campaigns or to probe "what if" scenarios by modifying the desired campaign parameters and observing the differences in overall scores. In some embodiments, the automatic scoring service is used to measure campaign outcomes across one or more business metrics and attributes as specified by the user. Thus, the automatic scoring service can iteratively define and fine-tune a target audience for the marketing campaign.

The present invention can be used in various stages of a marketing campaign, including (i) the research and brainstorm stage to identify customers, prospects and/or challenges, (ii) the design stage to specify campaign details, (iii) the execution stage to plan and launch additional marketing experiments, and (iv) the measure stage to monitor and analyze results and gather insights. The present invention can also be used in a range of business applications, such as predicting customer appointments to optimize online traffic or predicting account opening by customers in certain business segments following a marketing campaign.

Advantages associated with the systems and methods described herein include automatic identification of potential customers to be targeted during a new marketing campaign by learning from past campaigns without significant time and cost. More specifically, these leads can be generated in a matter of minutes based on curated data sets and pre-trained models, which represents a significant reduction from using a propensity model to generate the same leads that typically requires weeks to months of labor for a skilled data scientist. In contrast, no prior experience is needed for a user of the systems and methods of the present invention. Such savings can lead to reduced cohort size, improved lift, reduced campaign costs, and/or an increased conversion rate and higher return-on-investment (ROI) for a given campaign budget.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®, Google® Cloud).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above-described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer-implemented method for identifying potential individuals to contact in a campaign of interest, the computer-implemented method comprising:
   receiving, by a computing device, campaign data including description about the campaign of interest and information about the potential individuals to contact for the campaign of interest;
   training, by the computing device, a library of machine learning models corresponding to respective ones of a plurality of historical campaigns completed, wherein each machine learning model is trained based on data collected from the corresponding historical campaign to predict customer responses with respect to at least one key performance indicator (KPI);
   selecting, by the computing device, a plurality of trained machine learning models from the library of trained machine learning models based on the campaign data, wherein each of the selected plurality of trained models corresponds to a historical campaign from the plurality of historical campaigns that is within a similarity threshold from the campaign of interest, selecting the plurality of trained machine learning models comprises:
      numerically vectorizing the campaign description for the campaign of interest using natural language processing;
      comparing vectorized campaign description of the historical campaigns with the vectorized campaign description of the campaign of interest;
      selecting the relevant historical campaigns using cosine similarity to the campaign of interest and the similarity threshold; and
      selecting the corresponding trained machine learning models from the library of trained machine learning models generated for the relevant historical campaigns;
   scoring, by the computing device, a pool of existing customers using the select plurality of trained machine learning models, wherein scoring the pool of existing customers comprises:
      scoring each existing customer by the plurality of selected trained machine learning models to generate a plurality of model scores; and
      averaging the plurality of model scores to generate a propensity score for the corresponding existing customer; and
   identifying, by the computing device, the potential individuals to contact in the campaign of interest by ranking the existing customers by their corresponding propensity scores.

2. The computer-implemented method of claim 1, wherein the campaign data includes one or more of financial information of the potential individuals to contact, demographical information of the potential individuals to contact, and description of the campaign of interest.

3. The computer-implemented method of claim 1, wherein averaging the plurality of model scores comprises obtaining an average of the plurality of model scores.

4. The computer-implemented method of claim 1, wherein the potential individuals to contact for the campaign of interest are identified using the trained machine learning models corresponding to the relevant historical campaigns without training a new machine learning model.

5. The computer-implemented method of claim 1, further comprising, after completion of the campaign of interest, generating a trained model from the campaign of interest using machine learning and appending the trained machine learning model to the library.

6. The computer-implemented method of claim 5, wherein the machine learning model for the completed campaign of interest is trained using the campaign data about the campaign of interest, data about customers targeted and reached by the campaign of interest, and customer responses following an outreach of the campaign of interest, the trained machine learning model being configured to predict at least one campaign key performance indicator (KPI).

7. The computer-implemented method of claim 6, wherein the trained machine learning model predicts a likelihood that a customer with a given characteristic would perform an action toward the at least one KPI following the outreach of the campaign of interest.

8. The computer-implemented method of claim 1, further comprising generating, by the computing device, insights about the campaign of interest including at least one of a predicted response rate from the potential individuals identified or a recommendation of campaign message content for the campaign of interest.

9. The computer-implemented method of claim 1, further comprising displaying one or more campaign outcomes across one or more campaign metrics for one or more of the historical campaigns.

10. The computer-implemented method of claim 1, wherein the potential individuals are selected based on (i) their corresponding propensity scores exceeding a threshold propensity score, or (ii) their corresponding propensity scores being largest within a predetermined population size.

11. A computer-implemented system for identifying potential individuals to contact in a campaign of interest, the computer-implemented system comprising a computing device having a memory for storing instructions, wherein the instructions, when executed, configure the computer-implemented system to provide:
  a user interface module configured to receive campaign data including description about the campaign of interest and information about the potential individuals to contact for the campaign of interest;
  a training module configured to generate a library of trained machine learning models corresponding to respective ones of a plurality of historical campaigns completed, wherein each machine learning model is trained based on data collected from the corresponding historical campaign to predict customer responses with respect to at least one key performance indicator (KPI);
  an inference module configured to:
    select, from the library of trained machine learning models, a plurality of trained machine learning models based on the campaign data, wherein each of the selected plurality of trained models corresponds to a historical campaign from the plurality of historical campaigns that is within a similarity threshold from the campaign of interest, the inference module configured to select the plurality of trained machine learning models by:
      determining one or more relevant historical campaigns by (i) comparing vectorized description of the historical campaigns with vectorized description of the campaign of interest and (ii) selecting the relevant historical campaigns using cosine similarity to the campaign of interest and the similarity threshold; and
      selecting, from the model library module, the corresponding trained machine learning models generated for the relevant historical campaigns; and
    score a pool of existing customers using the select plurality of trained machine learning models by (1) scoring each existing customer by the plurality of selected trained machine learning models to generate a plurality of model scores, and (2) averaging the plurality of model scores to generate a propensity score for the corresponding existing customer; and
  wherein the user interface module is further configured to identify the potential individuals to contact in the campaign of interest by ranking the existing customers by their corresponding propensity scores.

12. The computer-implemented system of claim 11, further comprising a data extraction module configured to extract description related to the historical campaigns.

13. The computer-implemented system of claim 11, wherein the training module is further configured to, after completion of the campaign of interest, generate a trained model from the campaign of interest using machine learning and store the trained machine learning model in the model library.

14. The computer-implemented system of claim 13, wherein the training module is configured to train the machine learning model for the completed campaign of interest using the campaign data about the campaign of interest, data about customers targeted and reached by the campaign of interest, and customer responses following an outreach of the campaign of interest, the trained machine learning model being configured to predict at least one campaign key performance indicator (KPI).

15. The computer-implemented system of claim 14, wherein the trained machine learning model predicts a likelihood that a customer with a given characteristic would perform an action toward the at least one KPI following the outreach of the campaign of interest.

16. The computer-implemented system of claim 11, wherein the user interface module is further configured to generate insights about the campaign of interest including at least one of a predicted response rate from the potential individuals identified or a recommendation of campaign message content for the campaign of interest.

17. The computer-implemented system of claim 11, wherein the user interface module is further configured to display one or more campaign outcomes across one or more campaign metrics for one or more of the historical campaigns.

* * * * *